United States Patent Office 2,965,606
Patented Dec. 20, 1960

2,965,606
STABILIZATION OF POLYPROPYLENE WITH COMBINED MATERIALS

Francis P. Ford, Watchung, and John R. Lovett, Metuchen, N.J., assignors to Esso Research and Engineering Company, a corporation of Delaware No Drawing. Filed Apr. 24, 1959, Ser. No. 808,547

2 Claims. (Cl. 260—45.75)

This invention relates to an improved method of stabilizing polymers against oxidative and heat aging degradation. More particularly it relates to the prevention of this degradation in alpha olefin, solid, hydrocarbon polymers, prepared by the so-called low pressure process, by the utilization of a synergistic combination of minor amounts of both zinc dibutyldithio carbamate and 4,4'-thiobis (3-methyl-6-t-butyl phenol).

The low pressure polymerization of alpha olefins with catalyst systems made up of a partially reduced, heavy, transition metal compound and a reducing metal-containing compound to high density, often isotactic, high molecular weight, solid, relatively linear products has been assuming ever increasing importance and is now well known.

It is necessary to stabilize the polymers against oxidative and heat aging degradation. Many conventional components for this purpose have been found to be ineffective.

It has now been found that the polymers can be stabilized and degradation prevented by incorporating in them synergistic combinations of minor amounts of zinc dibutyl-dithio carbamate and 4,4'-thiobis (3-methyl-6-t-butyl phenol). The utilization of both of these components in combination results in a stabilizing effect far in excess of that obtained for each of the components individually. A synergistic interaction is thereby obtained.

The amount of zinc dibutyl-dithio carbamate utilized is conveniently in the range of about .01 to 2.0 wt. percent based on the polymers. The amount of 4,4'-thiobis (3-methyl-6-t-butyl phenol) utilized is conveniently in the range of about .01 to 2.0 wt. percent based on the polymers. These materials can be incorporated by milling, extruding or during deashing in the polymer processing. In the latter case they can be incorporated in the final rinse with the alcohol or acetone.

The alpha olefinic feeds utilized in polymerization to solid polymers include ethylene, propylene, butene-1, heptene-1, dodecene-1, etc., with ethylene and propylene preferred.

The actual process of preparing low pressure polymers is no part of this invention but is supplied for completeness. The process is described in the literature, e.g. see Belgian Patent 538,782, and "Scientific American," September 1957, pages 98 et seq.

In the process the polymers are prepared by polymerizing the constituent monomers in the desired proportions with the aid of certain polymerization catalysts, e.g. see above-mentioned Belgian patent. The catalysts are solid, insoluble, reaction products obtained by partially reducing a reducible, heavy, transition compound of a group IV–B, V–B, VI–B or VIII metal, e.g. titanium and vanadium halides such as the chlorides, with a reducing group I–III metal-containing material such as organometallic compound of an alkali, alkaline earth, rare earth metal or zinc. They can also be prepared by reducing an appropriate metal compound, e.g. $TiCl_4$, with the aid of metallic aluminum or a mixture of aluminum and titanium, etc. followed by activation with an aluminum alkyl. The preferred catalyst of this type is usually prepared by reducing one mole of titanium tetrahalide, usually tetrachloride, to the corresponding trivalent or subtrivalent titanium halide with about 0.2 to 6 moles of aluminum triethyl, triisobutyl or other aluminum alkyl compound of the formula RR'AlX. In this formula, R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride, aluminum triisobutyl, etc. The reduction is carred out by admixing each of the two catalyst components in an inert solvent, preferably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate in conjunction with some free aluminum alkyl compound is generally considered to constitute the actual active polymerization catalyst. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of the same or differing inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, desirably in combination with a chelating agent for deashing such as acetylacetone is normally added to the reaction mixture for the purpose of dissolving and deactivating the catalyst and for precipitating the polymer product from solution. After filtration, the solid polymer may be further washed with alcohol or acid, such as hydrochloric acid, dried, compacted and packaged.

The polymers produced have molecular weights in the range of about 50,000 to 300,000 or even as high as 3,000,000 as determined by the intrinsic viscosity method using the I. Harris correlation (J. Polymer Science, 8 361, 1952). The polymers can have a high degree of crystallinity and a low solubility in n-heptane.

It is to be understood that the term "low pressure" polymer as used herein connotes material prepared in the indicated manner.

This invention and its advantages will be better understood by reference to the following examples.

Example 1

Various formulations of identical low pressure polypropylene prepared by using an aluminum triethyl activated, aluminum-reduced $TiCl_4$ catalyst were made up utilizing various quantities of additives as indicated. These are tabulated below.

| Formulation | 1 | 2 | 3 | 4 |
|---|---|---|---|---|
| Polypropylene | 100 | 100 | 100 | 100 |
| 4,4'-thiobis (3-methyl-6-t-butyl phenol) | 0.1 | | 0.1 | 0.05 |
| Zinc dibutyl-dithio carbamate | | 0.1 | 0.1 | 0.05 |

These formulations were then treated as indicated and tensile strengths and elongation (both employing ASTM test D-412) compared. The results were as follows:

| | Original Tensile/ Elongation | Tensile/Elong., Air Oven @ 300° F. | | Oxygen Up-take Hrs. to Induction Period @ 300° F. |
|---|---|---|---|---|
| | | 24 Hrs. | 147 Hrs. | |
| 1. 4,4'-thiobis (3-methyl-6-t-butyl phenol) | 3,950/470 | 3,870/260 | 1,180/10 | 48.8 |
| 2. Zinc dibutyl-dithio carbamate | 4,020/660 | 4,070/400 | 2,700/20 | 57.7 |
| 3. Synergistic mixture | 4,000/410 | 3,830/410 | 4,060/210 | 116.0+ |
| 4. Synergistic mixture | 3,950/310 | 3,810/610 | ---------- | 71.2 |

These results show the marked improvement in the prolonged heat aging obtained by the synergistic mixture of components as compared with the individual compounds. The results at 147 hours for synergistic formulation 4 also shows a marked improvement. The oxygen up-take figures are also significantly improved.

The advantages of this invention will be apparent to those skilled in the art. Oxidative degradation in polymers is prevented in an efficient and economical manner.

It is to be understood that this invention is not limited to the specific examples which have been offered merely as illustrations and that modifications may be made without departing from the spirit of the invention.

What is claimed is:

1. In a method of stabilizing against oxidative degradation an alpha olefin, solid polypropylene polymer, prepared in the presence of a catalyst containing a partially reduced, heavy, transition metal compound, the improvement which comprises incorporating in the polymer a synergistic combination of a minor amount of both zinc dibutyl-dithio carbamate and 4,4'-thiobis (3-methyl-6-t-butyl phenol), each of these components being utilized in an amount of from .01 to 2.0 wt. percent based on the polymer.

2. A composition of matter comprising a solid alpha olefin, low pressure polypropylene polymer, prepared by utilizing a partially reduced, heavy, transition metal compound catalyst, admixed with a synergistic combination of a minor amount of both zinc dibutyl-dithio carbamate and 4,4'-thiobis (3-methyl-6-t-butyl phenol), each of these components being utilized in an amount of from .01 to 2.0 wt. percent based on the polymer.

References Cited in the file of this patent

UNITED STATES PATENTS 2,841,628    Albert ---------------- July 1, 1958

FOREIGN PATENTS 201,160    Australia -------------- Jan. 11, 1956